(12) United States Patent
Toshihiro (10) Patent No.: US 8,780,396 B2
(45) Date of Patent: Jul. 15, 2014

(54) PRINTING APPARATUS, PRINTING SYSTEM AND PRINTING METHOD FOR SWITCHING BETWEEN A POWER SAVING MODE

(75) Inventor: Naoki Toshihiro, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 136 days.

(21) Appl. No.: 13/541,316

(22) Filed: Jul. 3, 2012

(65) Prior Publication Data

US 2013/0010330 A1 Jan. 10, 2013

(30) Foreign Application Priority Data

Jul. 4, 2011 (JP) ................... 2011-148005

(51) Int. Cl.
*G06K 15/02* (2006.01)
(52) U.S. Cl.
USPC ............... 358/1.15; 358/1.1; 358/1.13
(58) Field of Classification Search
CPC ..... G06K 15/00; G06K 15/002; G06K 15/02; G06K 15/4055; G06K 15/406; H04N 1/00; H04N 1/00095; H04N 1/00885; H04N 1/00888; H04N 1/00891; H04N 1/00896; G06F 1/32; G06F 1/3203; G06F 1/325; G06F 1/1236
USPC ........ 358/1.1, 1.13, 1.15, 400, 401, 434, 435, 358/436, 438, 439, 468
See application file for complete search history.

(56) References Cited

U.S. PATENT DOCUMENTS

| 6,401,150 B1 * | 6/2002 | Reilly ........................... 710/104 |
| 2005/0179930 A1 | 8/2005 | Doi et al. |
| 2007/0146778 A1 | 6/2007 | Kitagata et al. |
| 2008/0170253 A1 | 7/2008 | Mohammad |

FOREIGN PATENT DOCUMENTS

| JP | 09-294174 A | 11/1997 |
| JP | 2001-238001 A | 8/2001 |
| JP | 2001-309092 A | 11/2001 |
| JP | 2006-272637 A | 10/2006 |
| JP | 2010-089424 A | 4/2010 |

OTHER PUBLICATIONS

Extended European Search Report dated Oct. 7, 2013 in application No. 12174568.1.

* cited by examiner

*Primary Examiner* — Thomas D Lee
(74) *Attorney, Agent, or Firm* — Maschoff Brennan

(57) ABSTRACT

A printing apparatus is connected to a host computer via a network, and operates in a first mode in which network communication is enabled and in a second mode in which network communication is disabled. The printing apparatus transmits a query about print data to the host computer after transition when having transited to the first mode from the second mode. Further, upon reception of print data having been transmitted by the host computer as a response to the query, the printing apparatus performs printing on the basis of the print data.

7 Claims, 10 Drawing Sheets

FIG. 1
PRINTING SYSTEM 0

FIG. 3

| | OPERATION MODE | PROMPT PRINTING | OPERATIONS OTHER THAN THOSE FOR PRINTING | NETWORK COMMUNICATION | EFFECTIVENESS OF POWER SAVING |
|---|---|---|---|---|---|
| NORMAL MODE | IDLING | ○ | ○ | ○ | — |
| POWER SAVING MODE 1 | ENGINE STANDBY | — | ○ | ○ | SMALL |
| POWER SAVING MODE 2 | CONTROLLER STANDBY | — | — | ○ | MIDDLE |
| POWER SAVING MODE 3 | OFF | — | — | — | LARGE |

PRINTING APPARATUS, PRINTING SYSTEM AND PRINTING METHOD FOR SWITCHING BETWEEN A POWER SAVING MODE

BACKGROUND

1. Technical Field

The present invention relates to a printing apparatus, a program, a printing system and a printing method.

2. Related Art

Some well-known printing apparatuses, such as copying machines, multifunction peripherals, and printers, have operation modes including a normal mode and a power saving mode in which power consumption thereof is lower than that of the normal mode.

For example, JP-A-2006-272637 discloses a printing apparatus which is configured to, on the basis of a timetable set therein, perform switching between a power supplying mode in which a prompt start of execution of a print job is made possible, and a power saving mode in which power consumption is lower than that of the power supplying mode and a predetermined preparation is needed before transiting to the power supplying mode.

In recent years, environmental requirements have become more sophisticated, and, for example, there have appeared printing apparatuses each having a power saving mode in which, not only electric power supplied to a CPU, memory modules, a printing engine and the like is disconnected, but also network communication is shut off. Hereinafter, a power saving mode in which the network communication is shut off will be also referred to as "an off mode."

Such a printing apparatus in an off mode can return from the off mode upon, for example, detection of an operation of an operation panel or the like included in this printing apparatus. However, such a printing apparatus in an off mode cannot return from the off mode even when a print instruction has been transmitted thereto from a host, such as a personal computer (PC), because network communication with the host is shut off. In this case, the host detects this situation as a print error.

As described above, a user cannot perform printing unless the user manually operates a printing apparatus in an off mode to return it from the off mode. That is, a user cannot return the printing apparatus from the off mode by means of a remote operation from a host, such as a PC. Therefore, such an off mode is inconvenient for users, and is not utilized even though the degree of power saving achieved by the off mode is particularly high.

SUMMARY

Thus, an advantage of some aspects of the invention is to achieve an improvement of the convenience of an off mode included in a printing apparatus.

According to a first aspect of the invention, a printing apparatus, which is connected to a host computer via a network, and which operates in a first mode in which network communication is enabled and in a second mode in which network communication is disabled, includes a control unit configured to control a bidirectional transition between the first mode and the second mode; a transmission unit configured to transmit a query about print data to the host computer when a transition from the second mode to the first mode has been made; a reception unit configured to receive print data having been transmitted from the host computer as a response to the query; and a printing unit configured to perform printing on the basis of the print data.

In the first aspect of the invention, the control unit may make a transition of the second mode to the first mode after an elapse of a predetermined period of time from the transition of the first mode to the second mode.

Further, the control unit may make a transition from the first mode to the second mode when any print data have not been received from the host computer in response to the query.

Further, the printing apparatus may further include a setting unit configured to receive and set a reservation time zone within which a transition from the first mode to the second mode is forbidden, and the control unit may be configured to make a transition from the second mode to the first mode within the reservation time zone.

Further, in the case where the host computer is one of a plurality of host computers, the setting unit may be configured to set the reservation time zones each correspond to respective host computers, and the printing unit may be configured to, in the case where, print data from any of the host computers have been received during a reservation time zone, preferentially perform printing of print data from a host computer corresponding to the reservation time zone.

Further, the setting unit may be configured to set the reservation time zone such that the frequency of printings in the reservation time zone is more than a predetermined value.

According to a second aspect of the invention, a program, which is stored in a computer connected to a printing apparatus via a network, causes the computer to function as an acquisition unit configured to acquire print data; causes the computer to function as a reception unit configured to receive a query about print data from the printing apparatus; causes the computer to function as a storage unit configured to store the print data therein; and causes the computer to function as a transmission unit configured to, in the case where communication with the printing apparatus is available, transmit the acquired print data to the printing apparatus, and in the case where communication with the printing apparatus is not available, store the acquired print data into the storage unit, and transmit the stored print data to the printing apparatus when the query has been received.

In the second aspect of the invention, the program may cause the transmission unit to, after having determined that communication with the printing apparatus is not available, stand in readiness for receiving the query within a predetermined period of time, and when the query has been received within the predetermined period of time, transmit the stored print data to the printing apparatus.

Further, the printing apparatus may transmit the query at a predetermined constant interval in time, and in this case, preferably, the predetermined period of time is longer than the predetermined constant interval in time.

Further, the program may cause the computer to function as an output unit configured to output error information in the case where the query has not been received within the predetermined period of time.

According to a third aspect of the invention, a driver program stored in a computer connected to a printing apparatus via a network, causes the computer to function as an acquisition unit configured to acquire print data; causes the computer to function as a reception unit configured to receive a query about print data from the printing apparatus; causes the computer to function as a storage unit configured to store the print data therein; and causes the computer to function as a transmission unit configured to, in the case where communication with the printing apparatus is available, transmit the acquired print data to the printing apparatus by outputting the acquired print data to a spooler, and in the case where communication with the printing apparatus is not available, store the acquired print data into the storage unit, and transmit the stored print data to the printing apparatus by outputting the stored print data to the spooler when the query has been received.

According to a fourth aspect of the invention, a driver program stored in a computer connected to a printing apparatus via a network, causes the computer to function as an acquisition unit configured to acquire print data; causes the computer to function as a reception unit configured to receive a query about print data from the printing apparatus; and causes the computer to function as a transmission unit configured to, in the case where communication with the printing apparatus is available, transmit the acquired print data to the printing apparatus by outputting the acquired print data to a spooler, and in the case where communication with the printing apparatus is not available, output the acquired print data to the spooler to cause the spooler to temporarily store the acquired print data therein, and transmit the print data to the printing apparatus by causing the spooler to output the stored print data when the query has been received.

According to a fifth aspect of the invention, a printing system includes a computer, and a printing apparatus which operates in a first mode in which network communication is enabled and in a second mode in which network communication is disabled. Further, the computer includes an acquisition unit configured to acquire print data; a reception unit configured to receive a query about print data from the printing apparatus; a storage unit configured to store the print data therein; a transmission unit configured to, in the case where communication with the printing apparatus is available, transmit the acquired print data to the printing apparatus, and in the case where communication with the printing apparatus is not available, store the acquired print data into the storage unit, and transmit the stored print data to the printing apparatus when the query has been received. Further, the printing apparatus includes a control unit configured to control a bidirectional transition between the first mode and the second mode; a transmission unit configured to, when a transition from the second mode to the first mode has been made, transmit a query about print data to the computer; a reception unit configured to receive print data having been transmitted from the computer; and a printing unit configured to perform printing on the basis of the print data.

According to a sixth aspect of the invention, a method for printing by using a printing system having a computer, and a printing apparatus which operates in a first mode in which network communication is enabled and in a second mode in which network communication is disabled, includes acquiring print data by the computer; transmitting, by the computer, the acquired print data to the printing apparatus in the case where communication with the printing apparatus is available; storing, by the computer, the acquired print data into the storage unit in the case where communication with the printing apparatus is not available; transmitting, by the computer, the stored print data to the printing apparatus when a query about print data has been received from the printing apparatus; performing control of, by the printing apparatus, a bidirectional transition between the first mode and the second mode; transmitting, by the printing apparatus, the query about print data to the computer when a transition from the second mode to the first mode has been made; receiving, by the printing apparatus, print data having been transmitted from the computer; and performing printing on the basis of print data using the printing apparatus.

Technical problems, configurations and advantageous effects other than those described hereinbefore will be apparent from exemplary embodiments to be hereinafter described.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, an example of a first embodiment according to the present invention will be described with reference to the drawings.

In this embodiment, a printer will be described as an example of a printing apparatus including an off mode. Naturally, such a printing apparatus is not limited to a printer, but may be a copying machine, a multifunction peripheral or the like.

Figure 1:
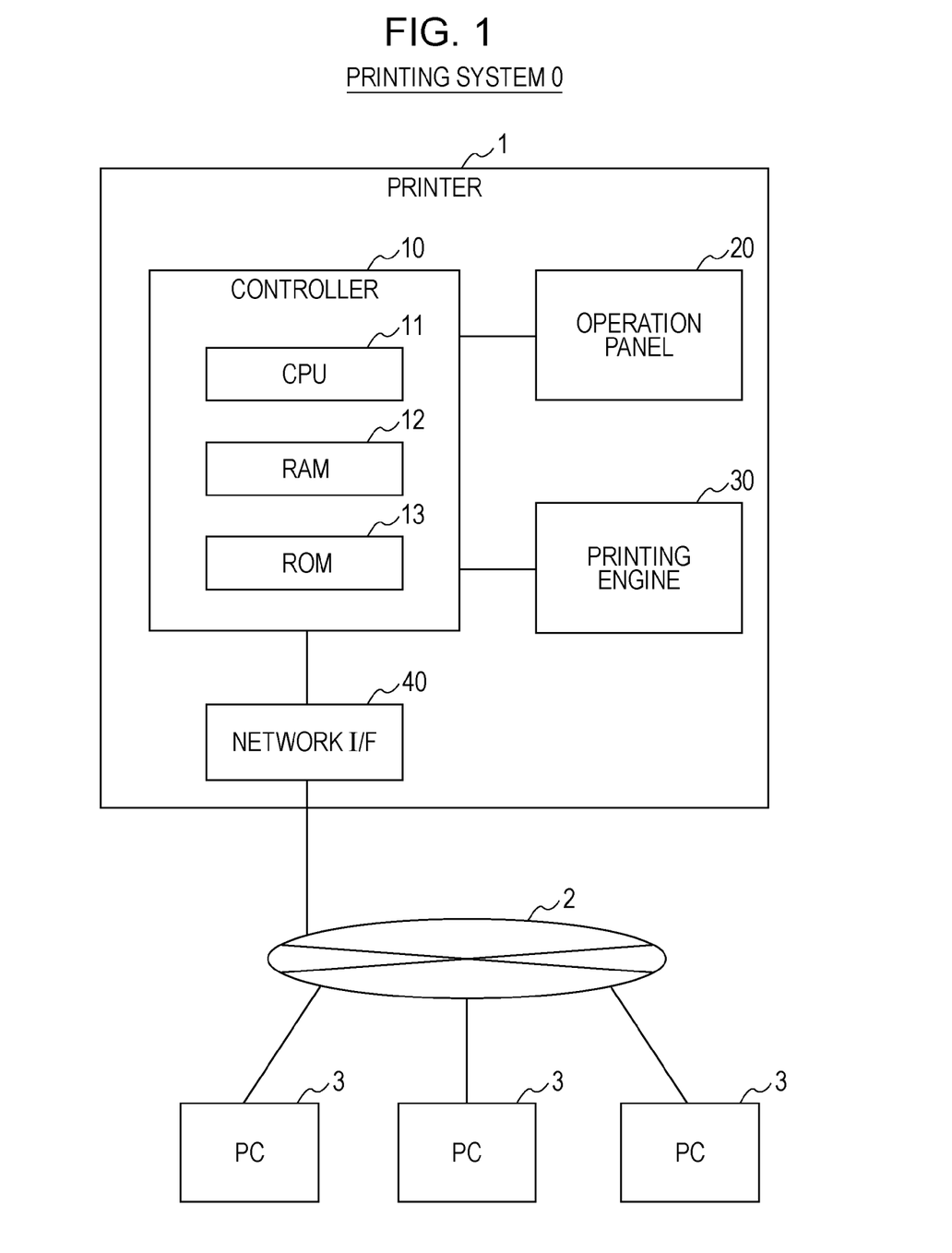
FIG. 1 is a diagram illustrating an example of an outline configuration of a printing system according to a first embodiment of the invention.

FIG. 1 is a diagram illustrating an example of an outline configuration of a printing system according to a first embodiment of the invention.

A printing system 0 includes a printer 1 and a plurality of PCs 3. The printer 1 and each of the PCs 3 are connected to each other via a network 2, such as a local area network (LAN).

Each of the PCs 3 causes, for example, a printer driver program installed therein to create print data (also referred to as "a print job"), and transmits the created print data to the printer 1 via the network 2. The printer 1 performs printing in accordance with print data having been received via, for example, the network 2.

The printer 1 is a printer employing, for example, the ink jet method or the laser method. The printer 1 includes a controller 10, an operation panel 20, a printing engine 30 and a network interface (I/F) 40.

The controller 10 is constituted by, for example, a chip, i.e., a system on chip (SoC), integrating main functions of the printer 1 therein, and the like, and performs control of the entire operation of the printer 1.

For example, upon reception of print data via the network interface 40, the controller 10 creates printing execution data to be outputted to the printing engine 30 on the basis of the received print data, and performs control so as to cause the printing engine 30 to execute printing based on the printing execution data. Further, for example, the controller 10 displays a menu screen and various setting screens on the operation panel 20. Further, the controller 10 receives user operations, including operations for changing various settings, via the operation panel 20.

Further, the controller 10 performs control of operation modes of the printer 1. The controller 10 performs control of transitions among a normal mode and a plurality of power saving modes, this control of transitions among modes being hereinafter described in detail.

In order to realize such various processes as described above, the controller 10 includes a central processing unit (CPU) 11, a random access memory (RAM) 12 and a read only memory (ROM) 13. In addition, the controller 10 may be constituted by an ASIC, which is designed so as to be an integrated circuit dedicated to the above-described various processes.

The CPU 11 executes various programs. The RAM 12 temporarily stores therein various kinds of data, such as print data and printing execution data, programs and the like. In the ROM 13, various kinds of data, various programs and the like for controlling the printer 1 are stored in advance in an involatile manner.

An operation panel 20 functions as an interface between users and the printer 1. The operation panel 20 includes, for example, a display for displaying images and the like, and input devices, such as a touch panel and buttons, for receiving user operations.

The printing engine 30 executes printing based on printing execution data having been outputted from the controller 10 onto a printing medium on the basis an instruction from the controller 10. The printing engine 30 is an engine employing, for example, the ink jet method or the laser method.

The network I/F 40 is a unit which is connected to the network 2, and which communicates with a host, such as the PC 3.

The PC 3 functions as a host of the printer 1. The PC 3 is a general computer including, for example, a CPU, RAM modules, ROM modules, an auxiliary storage device, a network I/F, a display, and input devices, such as a mouse device and a keyboard.

The PC 3 includes an operating system (OS), an application program, a printer driver program and the like installed therein. The printer driver creates printing execution data on the basis of print target data having been created by an application and transmits the created printing execution data to the printer 1.

The above-described configuration is an example of an outline configuration of the printing system. It is to be noted here that the above-described configuration is just a major configuration of the printing system in the foregoing description of the characteristics of the invention, and the configuration of the printing system is not limited to the above-described configuration. Moreover, the above-described configuration is not one that excludes any configuration included in a printing system, a printer and a PC which are commonly used.

Figure 2:
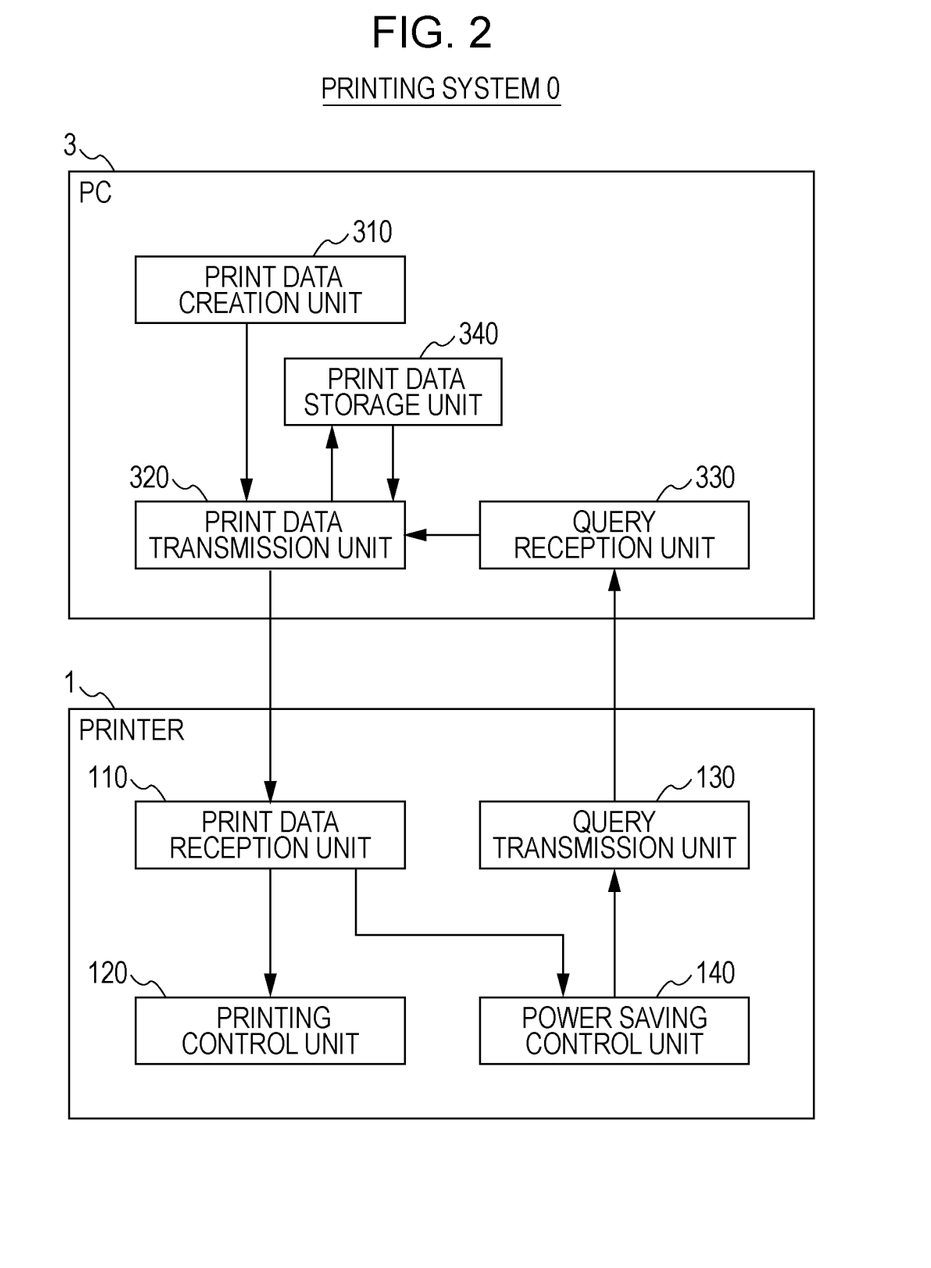
FIG. 2 is a diagram illustrating an example of a configuration of functions of a printing system according to a first embodiment of the invention.

FIG. 2 is a diagram illustrating an example of a configuration of functions included in a printing system according to this embodiment.

The PC 3 includes a print data creation unit 310, a print data transmission unit 320, a query reception unit 330 and a print data storage unit 340.

These function units are realized by, for example, causing the CPU to execute predetermined programs having been loaded into the RAM modules from the auxiliary storage device. These predetermined programs are stored in the auxiliary storage device in advance. Naturally, these predetermined programs may be installed and/or updated by being downloaded from a network via the network I/F. Further, in the case where the PC includes a device for reading out data from a portable storage medium, these predetermined programs may be installed and/or updated by being read out from the relevant storage medium.

The print data creation unit 310 is a function unit for creating print data. For example, the print data creation unit 310 receives a print instruction and a designation of print target data, which have been issued by a user operation, via certain one of the applications, and on the basis of the print target data, creates print data which can be interpreted by the printer 1.

The print data transmission unit 320 is a function unit for transmitting print data to the printer 1. For example, when print data has been created by the print data creation unit 310, the print data transmission unit 320 acquires the print data, and determines whether communication with the printer 1 via the network I/F is available, or not.

If the communication with the printer 1 is available, the print data transmission unit 320 transmits the acquired print data to the printer 1 via the network I/F. In contrast, if the communication with the printer 1 is not available (here, if the printer 1 is in an off mode), the print data transmission unit 320 stores the acquired print data into the print data storage unit 340.

Upon notification from the query reception unit 330 that a query about print data has been received, the print data transmission unit 320 acquires the print data having been stored into the print data storage unit 340, and transmits the acquired print data to the printer 1.

The query reception unit 330 is a function unit for receiving queries about print data from the printer 1. The query reception unit 330 monitors whether a query has been received, or not, and when a query has been received, the query reception unit 330 notifies the print data transmission unit 320 of the query.

The print data storage unit 340 is a function unit for storing print data therein. For example, the print data storage unit 340 stores therein print data having been designated by the print data transmission unit 320.

The above-described individual function units included in the PC 3 can be realized by a printer driver. In this case, more specifically, when communication with the printer 1 is available, or a query has been notified, the print data transmission unit 320 outputs (registers) print data into a spooler provided by the OS. The spooler transmits the registered print data (print job) to the printer 1 via the network I/F. By means of such a configuration, it is possible to prevent occurrence of a situation in which, when the printer 1 is in the off mode, the spooler determines the result of printing as a print error due to the unavailability of the communication with the printer 1.

At least one of the above-described individual function units of the PC 3 may not be realized by the printer driver but may be realized by a different program. For example, the print data storage unit 340 may be realized by the spooler. In this case, when print data has been created, the print data transmission unit 320 outputs (registers) the print data into the spooler, and further, sets the print data (the print job) into a pause state. Further, when communication with the printer 1 is available, or a query has been notified, the print data transmission unit 320 releases the pause state of the print data (the print job) having been registered into the spooler. By means of such a configuration, it is also possible to prevent occurrence of a situation in which, when the printer 1 is in the off mode, the spooler determines the result of printing as a print error due to the unavailability of the communication with the printer 1.

The printer 1 includes a print data reception unit 110, a printing control unit 120, a query transmission unit 130 and a power saving control unit 140.

These function units are realized by, for example, causing the CPU 11 to execute predetermined programs having been loaded into the RAM 12 from the ROM 13. These predetermined programs are stored in the ROM 13 in advance. Naturally, the predetermined programs may be installed and/or updated by being downloaded from a network via the network I/F 40. Further, in the case where the printer 1 includes a device for reading out data from a portable storage medium, the predetermined programs may be installed and/or updated by being read out from the relevant storage medium.

The print data reception unit 110 is a function unit for receiving print data. For example, upon reception of print data from certain one of the PCs 3 via the network I/F 40, the print data reception unit 110 notifies the printing control unit 120 of the relevant print data. Further, the print data reception unit 110 notifies the power saving control unit 140 of the reception of the print data.

The printing control unit 120 is a function unit for performing control of the printing engine 30. For example, the printing control unit 120 acquires print data from the print data reception unit 110, creates printing execution data to be outputted to the printing engine 30 on the basis of the print data, and performs control so as to cause the printing engine 30 to perform printing based on the printing execution data.

The query transmission unit 130 is a function unit for transmitting a query about print data to external apparatuses. For example, the query transmission unit 130 transmits a query to the network 2 via the network I/F 40 when the printer 1 has returned from an off mode in accordance with control performed by the power saving control unit 140. The query is, for example, broadcast-transmitted, and is received by the PCs 3 each having the query reception unit 330.

The power saving control unit 140 is a function unit for performing control of transitions among a normal mode and a plurality of power saving modes.

Figure 3:
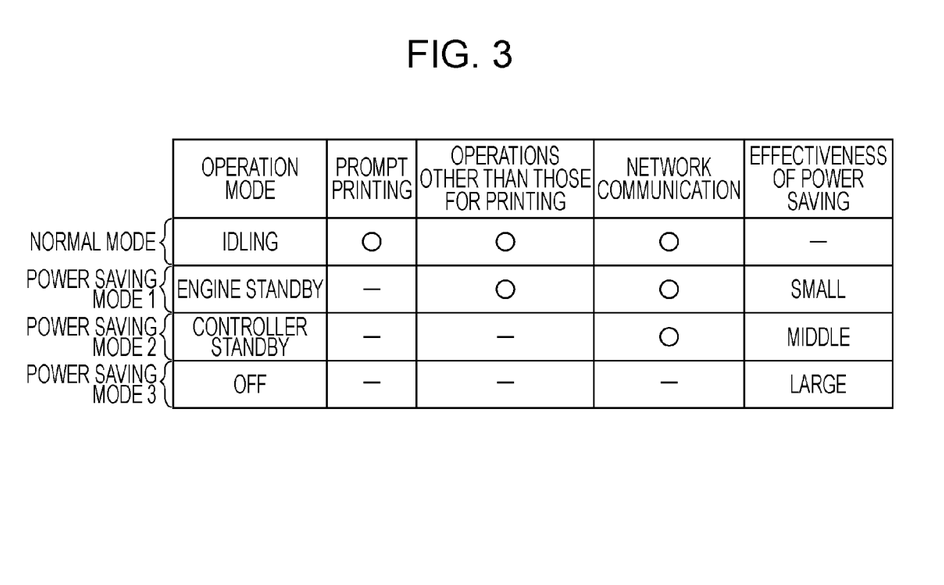
FIG. 3 is a diagram illustrating an example of relations among individual operation modes of a printer according to a first embodiment of the invention.

In an example of this embodiment, the printer 1 has, for example, as shown in FIG. 3, a normal mode in which the printer 1 is in an idling state, a power saving mode 1 in which the printer 1 is in an engine standby state, a power saving mode 2 in which the printer 1 is in a controller standby mode, and a power saving mode 3 (an off mode) in which the printer 1 is in an off state.

In the normal mode, upon reception of print data, the printer 1 can promptly perform printing based on the print data. Further, upon reception of an operation other than operations for printing, such as an operation for changing settings for printing, from certain one of the PCs 3 via the network 2, the printer 1 can perform processing in accordance with the operation. Further, the printer 1 can perform network communication.

In the power saving mode 1, since the printing engine 30 is in the standby state, the printer 1 cannot promptly perform printing.

In the power saving mode 2, since, additionally, the controller 10 is in the standby state, the printer 1 cannot promptly perform printing. Moreover, upon reception of an operation other than operations for printing, the printer 1 cannot perform processing in accordance with the operation, such as processing for changing settings for printing.

In the power saving mode 3, since, further additionally, the network OF is in the off state, the printer 1 can neither promptly perform printing, nor perform processing in accordance with an operation other than operations for printing, nor perform network communication.

As described above, in accordance with the following order: the power saving modes 1, the power saving mode 2, and the power saving mode 3, the degree of the power saving becomes higher, and the advantageous effect of the power saving becomes larger.

Figure 4:
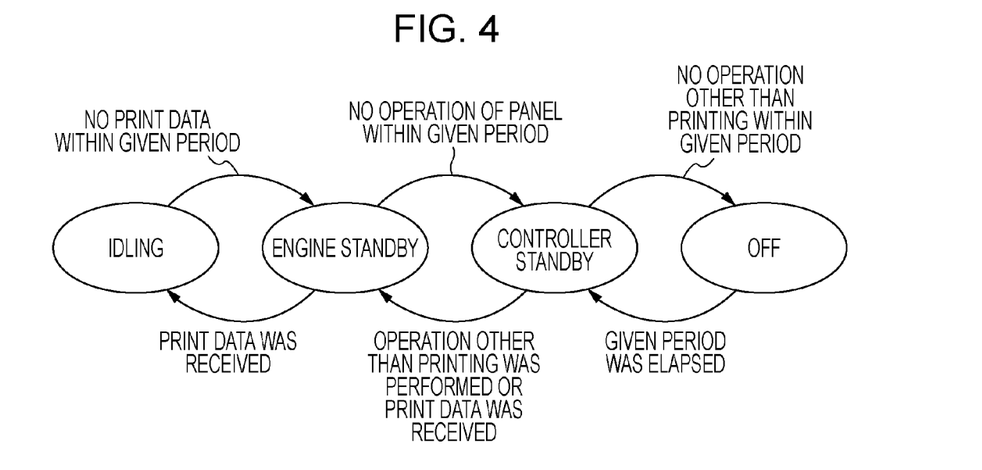
FIG. 4 is a diagram illustrating an example of state transitions among individual operation modes of a printer according to a first embodiment of the invention.

For example, as described in FIG. 4, the power saving control unit 140 performs control of transitions among the above-described individual operation modes.

In the idling state (the normal mode), the power saving control unit 140 monitors whether or not, under the state where any blocks of print data have not been received, a predetermined constant period of time has elapsed. When this conditions has been satisfied, the power saving control unit 140 switches the printing engine 30 into the standby state, thereby causing the printer 1 to transit to the engine standby state (the power saving mode 1).

In the engine standby state (the power saving mode 1), the power saving control unit 140 monitors whether or not, a block of print data has been received. When this condition has been satisfied, the power saving control unit 140 switches the printing engine 30 into the normal state, thereby causing the printer 1 to transit to the idling state (the normal mode). Moreover, in the engine standby state (the power saving mode 1), the power saving control unit 140 monitors whether or not, under the state where the operation panel 20 has not been operated, a predetermined constant period of time has elapsed. When this condition has been satisfied, the power saving control unit 140 switches the controller 10 into the standby mode, thereby causing the printer 1 to transit to the controller standby state (the power saving mode 2).

In addition, in the power saving mode 2, a minimum portion, which allows the print data reception unit 110, the query transmission unit 130 and the power saving control unit 140 to function, is made operative on the controller 10. The printing control unit 120 may not function.

In the controller standby state (the power saving mode 2), the power saving control unit 140 monitors whether or not, a block of print data has been received, or an operation other than operations for printing has been performed. When any one of these conditions has been satisfied, the power saving control unit 140 switches the controller 10 into the normal state, thereby causing the printer 1 to transit to the engine standby state (the power saving mode 1). Moreover, in the controller standby state (the power saving mode 2), the power saving control unit 140 monitors whether or not, under the state where any operations other than operations for printing have not been performed, a predetermined constant period of time has elapsed. When this condition has been satisfied, the power saving control unit 140 switches the network I/F 40 into the off state, thereby causing the printer 1 to transit to the off state (the power saving mode 3).

In addition, in the power saving mode 3, a minimum portion, which allows the power saving control unit 140 to function, is made operative on the controller 10. The print data reception unit 110, the query transmission unit 130 and the printing control unit 120 may not function.

In the off state (the power saving mode 3), the power saving control unit 140 monitors whether or not, a predetermined constant period of time starting at the transition to the off state has elapsed. When this condition has been satisfied, the power saving control unit 140 switches the network I/F 40 into an on state, thereby causing the printer 1 to transit to the controller standby state (the power saving mode 2). Naturally, upon detection of an operation of the operation panel 20, the power saving control unit 140 may cause the printer 1 to transit to the power saving mode 2.

In addition, it is to be noted here that kinds, contents, transition conditions and the like with respect to the operation modes of the printer 1 are not limited to those described above. In the description of the characteristics of this embodiment, the operation modes of the printer 1 are not limited to those described above, provided that the printer 1 has at least the normal mode and the off mode, and returns from the off mode after an elapse of a predetermined constant period of time.

The above-described function configuration is a configuration resulting from segmentation in accordance with major process contents for the purpose of easy understanding of the configuration of the printing system. The present invention is not limited by any way of segmentation into configuration components, and any names of the resultant configuration components. The configurations of the printer 1 and the PC 3 can be each segmented into a larger number of configuration components, according to a different aspect of process contents. Further, the segmentation can be performed such that each configuration component can execute a larger number of processes. Moreover, processes of each configuration component may be executed by a single hardware component, or may be executed by a plurality of hardware components.

Figure 5:
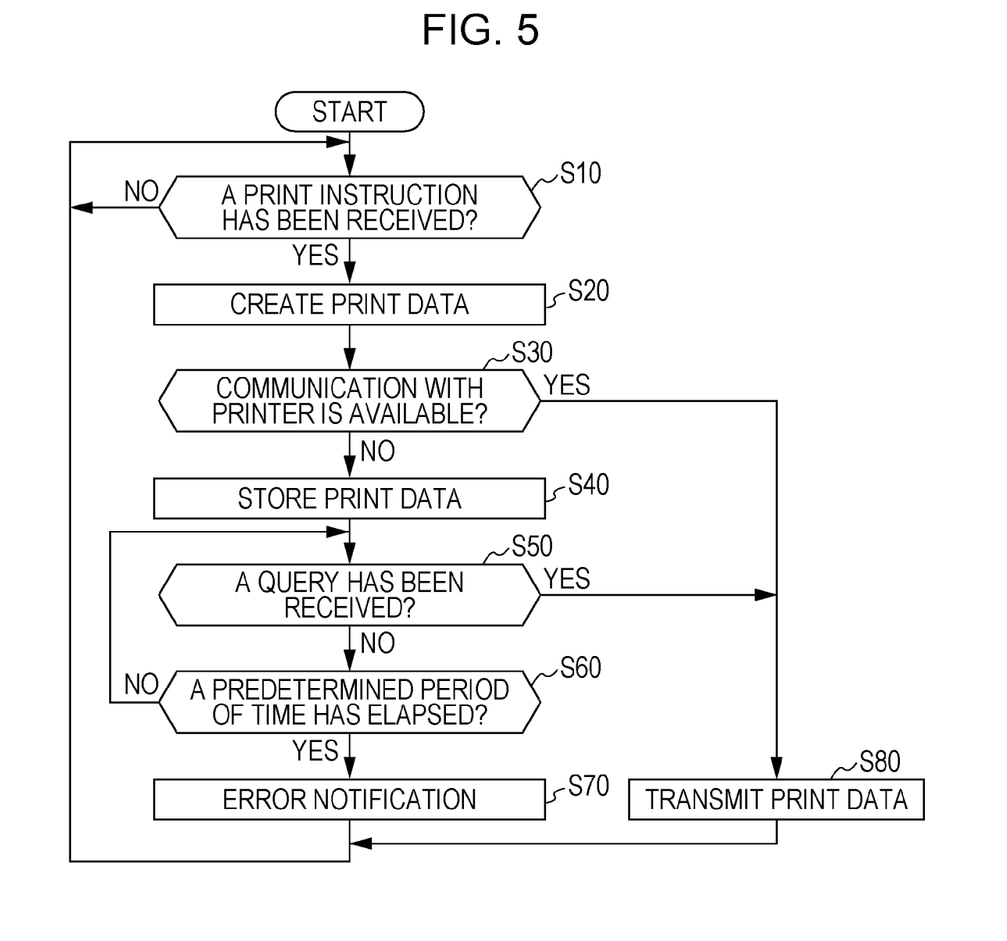
FIG. 5 is a flowchart illustrating an example of printing processing performed by a PC according to a first embodiment of the invention.

FIG. 5 is a flowchart illustrating an example of printing processing performed by a PC according to this embodiment.

In S10, the print data creation unit 310 monitors whether a print instruction has been received, or not. Specifically, for example, the print data creation unit 310 determines whether a print instruction from certain one of the applications has been received, or not. If a print instruction has been received (S10: YES), the print data creation unit 310 causes the process flow to proceed to S20. If any print instructions are not received (S10: NO), the print data creation unit 310 continues the monitor.

In S20, the print data creation unit 310 creates print data. Specifically, the print data creation unit 310 acquires print target data from the application, and creates print data on the basis of the print target data. Further, the print data creation unit 310 causes the process flow to proceed to S30.

In S30, the print data transmission unit 320 determines whether communication with the printer 1 is available, or not. Specifically, the print data transmission unit 320 transmits a predetermined packet of data to the printer 1 via the network I/F, and determines whether a response thereto has been received, or not.

If the communication with the printer 1 is available (S30: YES), the print data transmission unit 320 causes the process flow to proceed to S80. If the communication with the printer 1 is not available (S30: NO), the print data transmission unit 320 causes the process flow to proceed to S40.

In S40, the print data transmission unit 320 stores the print data. Specifically, the print data transmission unit 320 stores the print data having been created in S20 into the print data storage unit 340. Further, the print data transmission unit 320 causes the process flow to proceed to S50. In addition, in order to perform processing of S60, the print data transmission unit 320 starts measuring a predetermined period of time at the timing when having stored the print data. The print data transmission unit 320 may start measuring a predetermined period of time at the timing when having determined that communication with the printer 1 is not available. The print data transmission unit 320 may start measuring a predetermined period of time at a different timing, provided that the different timing is posterior to the timing when having determined that communication with the printer 1 is not available.

In S50, the query reception unit 330 monitors whether a query about the print data has been received from the printer 1, or not. If a query about print data has been received (S50: YES), the query reception unit 330 notifies the print data transmission unit 320 of the query, and the query reception unit 330 causes the process flow to proceed to S80. If any queries about the print data are not received (S50: NO), the query reception unit 330 causes the process flow to proceed to S60.

In S60, the print data transmission unit 320 determines whether the predetermined period of time has elapsed, or not. Here, the predetermined period of time is a period of time longer than each of constant intervals at which the printer 1 transmits the query. The above-described constant interval is a constant interval which starts at the timing when the printer 1 transmits a first query in the power saving mode 2, afterward, the printer 1 transiting to the power saving mode 3, further, the printer 1 returning to the power saving mode 2, and which terminates at the timing when the printer 1 transmits a next second query. In this way, for example, the PC 3 can receive at least one query while measuring the above-described predetermined period of time. If the predetermined period of time has elapsed (S60: YES), the print data transmission unit 320 causes the process flow to proceed to S70. If the predetermined period of time is not yet elapsed (S60: NO), the print data transmission unit 320 returns the process flow to S50.

In S70, the print data transmission unit 320 issues an error notification. Specifically, for example, the print data transmission unit 320 displays (outputs) on the operation panel 20 error information indicating that the printing corresponding to the print instruction has failed. Such a situation that the print data transmission unit 320 has not been able to receive any queries in spite of waiting for the predetermined period of time occurs when, for example, a power supplier of the printer 1 is turned off, the network 2 is interrupted, or the like. The print data transmission unit 320 returns the process flow to S10 after having issued the error notification. In addition, when issuing the error notification, the print data transmission unit 320 may delete the print data stored in the print data storage unit 340.

In S80, the print data transmission unit 320 transmits print data. Specifically, if the determination is YES in S30, the print data transmission unit 320 transmits the print data having been created in S20 to the printer 1 via the network I/F. If the determination is YES in S50, the print data transmission unit 320 acquires the print data having been stored into the print data storage unit 340 in S40, and transmits the print data to the printer 1. Further, the print data transmission unit 320 returns the process flow to S10.

As described above, when communication with the printer 1 is not available, the PC 3 waits for a query to be transmitted from the printer 1, and transmits print data to the printer 1 when having received the query. Further, when any queries from the printer 1 have not been received for a predetermined period of time, the PC 3 notifies a user of occurrence of an error.

Figure 6:
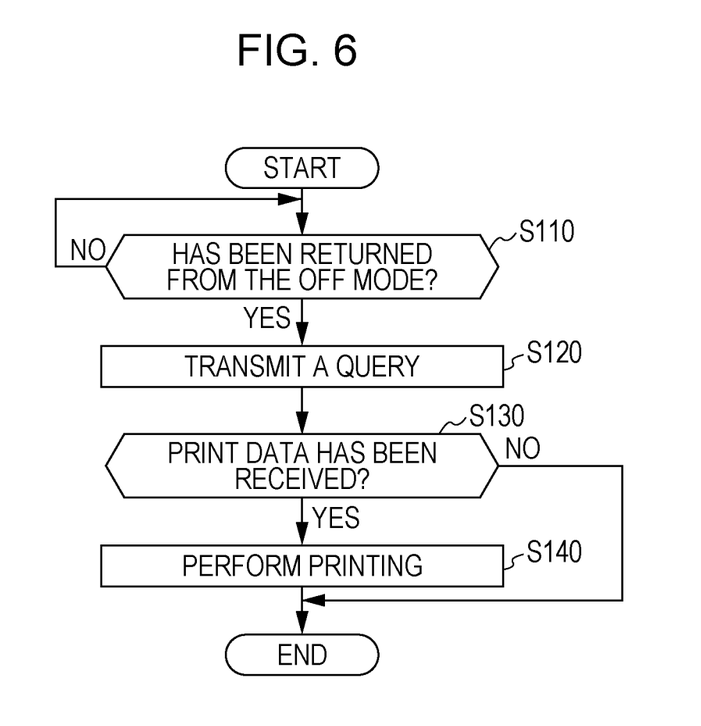
FIG. 6 is a flowchart illustrating an example of printing processing performed by a printer according to a first embodiment of the invention.

FIG. 6 is a flowchart illustrating an example of printing processing performed by a printer according to this embodiment. This process flow starts at the timing when the printer 1 has transited to the power saving mode 2 from the off state (the power saving mode 3) in accordance with control performed by the power saving control unit 140.

In S110, the query transmission unit 130 monitors whether the printer 1 has returned from the off state, or not. Specifically, the query transmission unit 130 determines whether or not, the operation mode has transited to the controller standby state (the power saving mode 2) from the off state (the power saving mode 3) in accordance with control performed by the power saving control unit 140. If the operation mode has returned from the off mode (S110: YES), the query transmission unit 130 causes the process flow to proceed to S120. If the operation mode is not yet returned from the off mode (S110: NO), the query transmission unit 130 continues the monitor.

In S120, the query transmission unit 130 transmits a query. Specifically, the query transmission unit 130 transmits a query to the network 2 via the network I/F 40. Further, the query transmission unit 130 causes the process flow to proceed to S130.

In S130, the print data reception unit 110 monitors whether at least one block of print data has been received, or not. Specifically, for example, the print data reception unit 110 determines whether or not, at least one block of print data has been received within a predetermined period of time starting at the transmission of the query. If at least one block of print data has been received (S130: YES), the print data reception unit 110 causes the process flow to proceed to S140. If any blocks of print data have not been received (S130: NO), the print data reception unit 110 terminates this process flow.

Here, in the case where at least one block of print data has been received, the printer 1 returns to the power saving mode 1, and further, returns to the normal mode, in accordance with control performed by the power saving control unit 140. In the case where any blocks of print data have not been received, when the above-described predetermined condition has been satisfied, the printer 1 transits to the off mode again in accordance with control performed by the power saving control unit 140. In the case where any blocks of print data have not been received as responses to the query within the predetermined period of time, the printer 1 may immediately transit to the off mode.

In S140, the printing control unit 120 executes printing. Specifically, the printing control unit 120 acquires print data from the print data reception unit 110, creates printing execution data to be outputted to the printing engine 30 on the basis of the print data, and performs control so as to cause the printing engine 30 to execute printing based on the created printing execution data. In addition, in the case where a plurality of blocks of print data has been received, printings thereof are performed in the order of reception. After having executed the printings, the printing control unit 120 terminates the process flow.

As described above, when having returned from the off mode upon elapse of a predetermined constant period of time, the printer 1 transmits a query to the PCs 3. Further, when having received at least one block of print data from any of the PCs 3 as at least one response to the query, the printer 1 executes printing based on the at least one block of print data. When having not received any blocks of print data from the PCs 3, the printer 1 transits to the off mode again.

Hereinbefore, an example of the first embodiment according to the invention has been described. According to this embodiment, it is possible to improve the convenience of the off mode of a printing apparatus.

That is, according to this embodiment, even after having transited to the off mode in which network communication is disabled, the printing apparatus returns to a state where the network communication is enabled, upon elapse of a predetermined constant period of time. Moreover, when having returned to the state, the printing apparatus transmits a query about print data, and in the case where at least one block of print data has been received, the printing apparatus executes printing based on the at least one block of print data. Meanwhile, in the case where communication with the printing apparatus is not available, a host retains print data therein until reception of a query. By means of such a configuration, along with utilizing the off mode in which the degree of the power saving is particularly high, users can remotely perform printing. Thus, the convenience of the off mode is improved, whereby further power saving employing the off mode can be achieved.

Second Embodiment

Next, an example of a second embodiment according to the invention will be described with reference to the drawings. Hereinafter, descriptions thereof will be made focusing on differences from those of the foregoing first embodiment.

Figure 7:
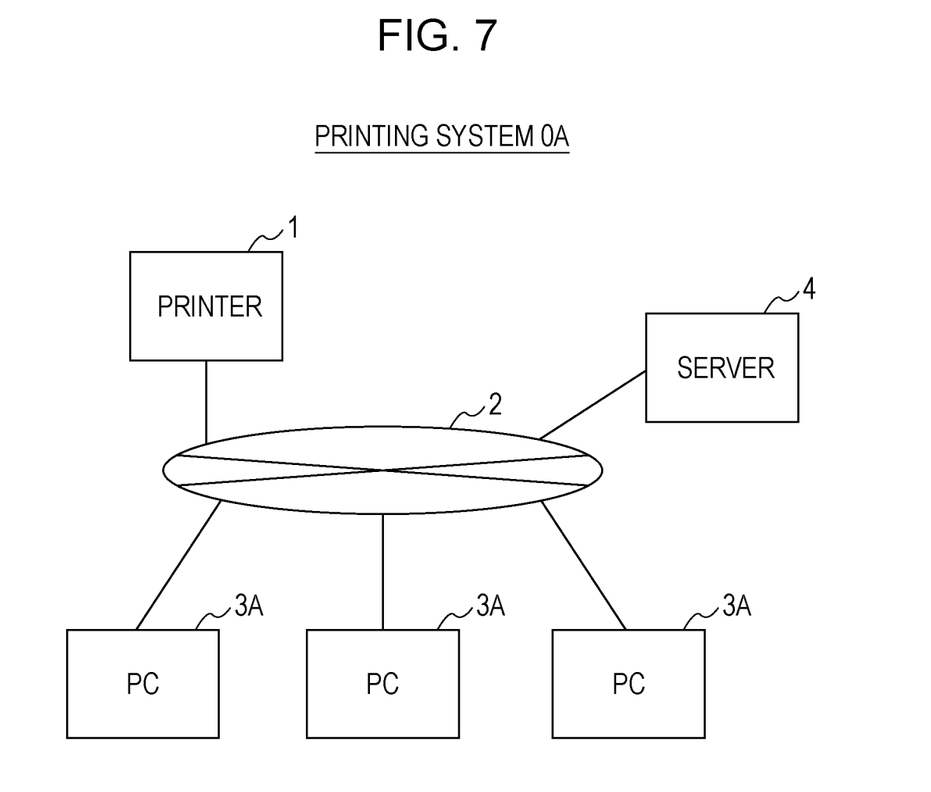
FIG. 7 is a diagram illustrating an example of an outline configuration of a printing system according to a second embodiment of the invention.

FIG. 7 is a diagram illustrating an example of an outline configuration of a printing system according to a second embodiment of the invention.

The printing system OA includes a printer 1, PCs 3A and a server 4. The server 4 is connected to a network 2.

The server 4, which is, for example, a print server, receives print data from each of the PCs 3A via the network 2, and temporarily stores the received print data therein. The server 4 transmits the received print data to the printer 1. The PCs 3A each handle the server 4 as a virtual printer of the printer 1, and transmits print data to the server 4.

The server 4 is a general computer including, for example, a CPU, RAM modules, ROM modules, an auxiliary storage device, a network I/F, a display, and input devices, such as a mouse device and a keyboard.

Figure 8:
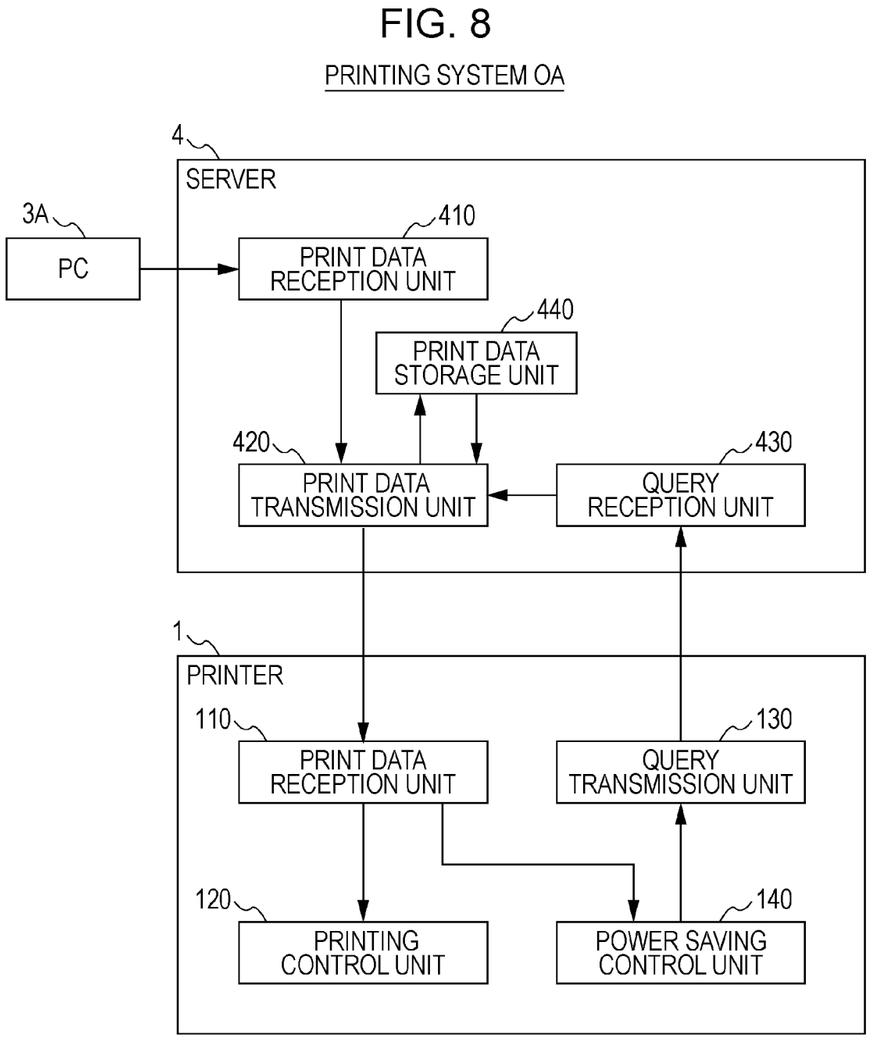
FIG. 8 is a diagram illustrating an example of a configuration of functions of a printing system according to a second embodiment of the invention.

FIG. 8 is a diagram illustrating an example of a configuration of functions of a printing system according to this embodiment.

The PC 3A creates print data, and transmits the print data to the server 4 differently from the PC 3 having been described with reference to FIG. 2. The printer 1 functions just like the printer 1 having been described with reference to FIG. 2.

The server 4 includes a print data reception unit 410, a print data transmission unit 420, a query reception unit 430 and a print data storage unit 440. These function units are realized by, for example, causing the CPU to execute predetermined programs having been loaded into the RAM modules from the auxiliary storage device.

Since the print data transmission unit 420, the query reception unit 430 and the print data storage unit 440 function just like the print data transmission unit 320, the query reception unit 330 and the print data storage unit 340 of the PC 3, which have been described with reference to FIG. 2, respectively, descriptions thereof will be omitted. In addition, the print data transmission unit 420 processes print data, which has been received by the print data reception unit 410, as data targeted for transmission to the printer 1.

The print data reception unit 410 is a function unit for receiving print data. The print data reception unit 410 receives print data having been transmitted from each of the PCs 3A. That is, the print data reception unit 410 acquires print data from other apparatuses.

Figure 9:
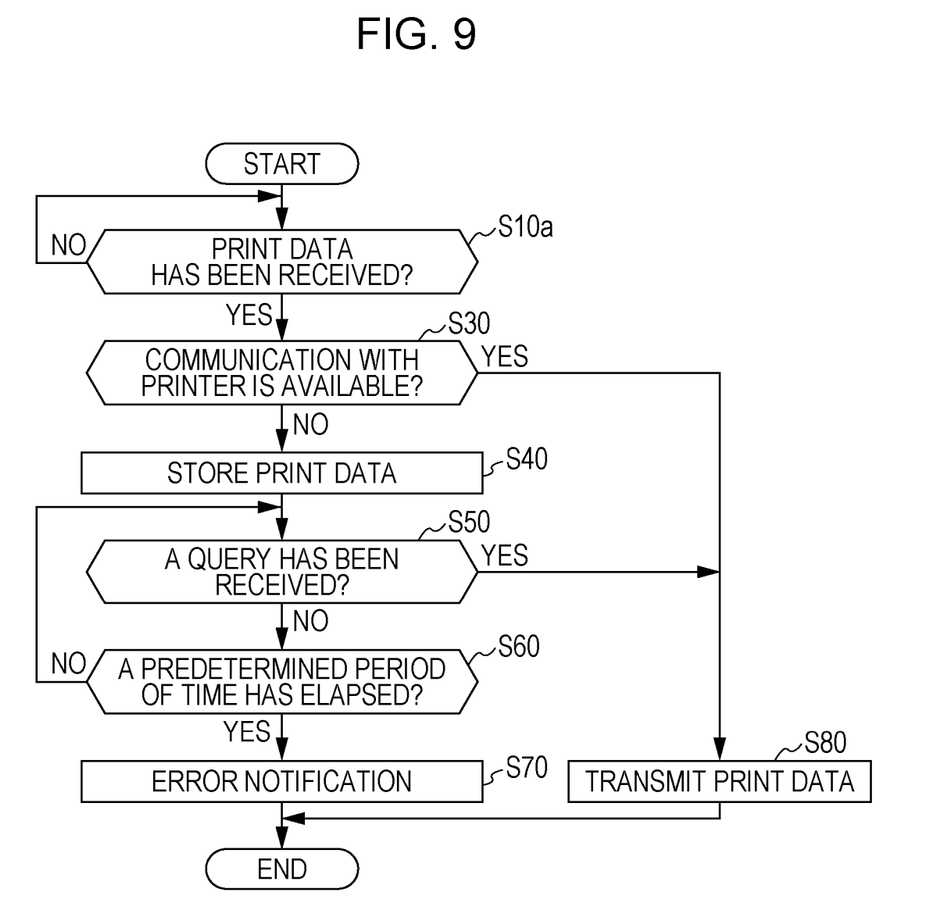
FIG. 9 is a flowchart illustrating an example of printing processing performed by a server according to a second embodiment of the invention.

FIG. 9 is a flowchart illustrating an example of printing processing performed by a server according to this embodiment.

In S10a, the print data reception unit 410 monitors whether at least one block of print data has been received, or not. If at least one block of print data has been received (S10a: YES), the print data reception unit 410 causes the process flow to proceed to S30. If any blocks of print data are not received (S10a: NO), the print data reception unit 410 continues the monitor.

Processes of S30 to S80 are just like those of S30 to S80 of FIG. 5, and thus, are omitted from description. In addition, in S70, an error notification may be transmitted (outputted) to the PC 3A, which is a transmission source of the print data. In this case, upon reception of the error notification, the PC 3A indicates the occurrence of an error on, for example, the display thereof.

Hereinbefore, an example of the second embodiment according to the invention has been described. According to this embodiment, it is possible to improve the convenience of the off mode of a printing apparatus just like in case of the first embodiment. The users of the PCs can perform printing operations as usual without being conscious of the off mode included in the printing apparatus. Moreover, even when the PC is in a power-off state after having transmitted print data, printing based on the print data is executed by the server and the printer.

Third Embodiment

Next, an example of a third embodiment according to the invention will be described with reference to the drawings. Hereinafter, descriptions thereof will be made focusing on differences from those of the foregoing first embodiment.

Figure 10:
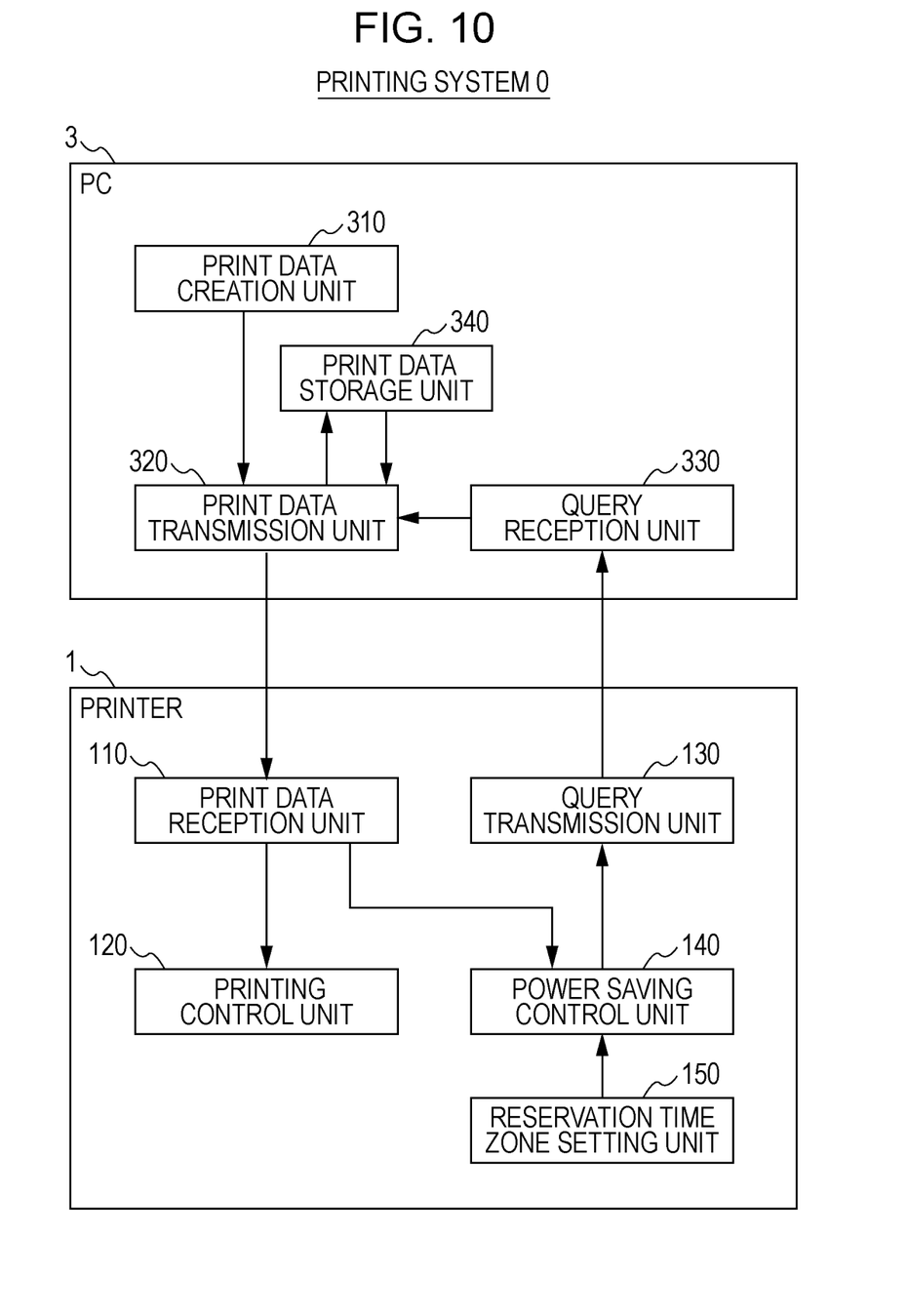
FIG. 10 is a diagram illustrating an example of a configuration of functions of a printing system according to a third embodiment of the invention.

FIG. 10 is a diagram illustrating an example of a configuration of functions of a printing system according to a third embodiment of the invention.

The PC 3 functions just like the PC 3 having been described with reference to FIG. 2. The printer 1 includes a reservation time zone setting unit 150 differently from the printer 1 having been described with reference to FIG. 2.

The reservation time zone setting unit 150 receives settings of reservation time zones, in each of which any transitions to the off mode are forbidden. The setting of reservation time zones is received via, for example, the operation panel 20. Handling may be performed such that the printer driver of the PC 3 displays a predetermined screen to receive a setting of a reservation time zone, and transmits the reservation time zone to the printer 1.

The reservation time zone setting unit 150 receives, for example, a reservation time zone for each of the PCs 3 (for each of users). The reservation time zone may be set such that, for example, a start clock time and an end clock time of the time zone are set in the form of hh:mm (hour:minute). Further, the reservation time zone may be recoded such that, for example, identification information related to each PC 3 (identification information related to each of users) is caused to correspond to the start clock time and the end clock time.

Figure 11:
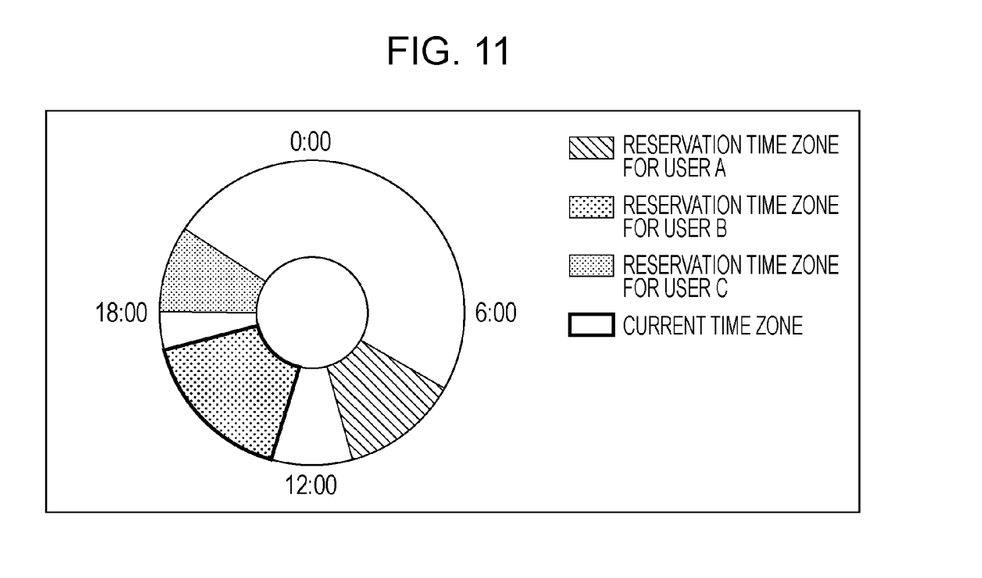
FIG. 11 is a diagram illustrating an example of a screen for setting reservation time zones, according to a third embodiment of the invention.

The reservation time zones can be received by means of, for example, a GUI screen such as shown in FIG. 11. On the GUI screen, time zones for 24 hours are displayed in the form of a circular graph. In the circular graph, areas corresponding to reservation time zones of users are displayed in the indication forms specific to the users, respectively. A user decides a reservation time zone by, for example, operating the operation panel 30 to input the start clock time and the end clock time thereof.

Figure 12:
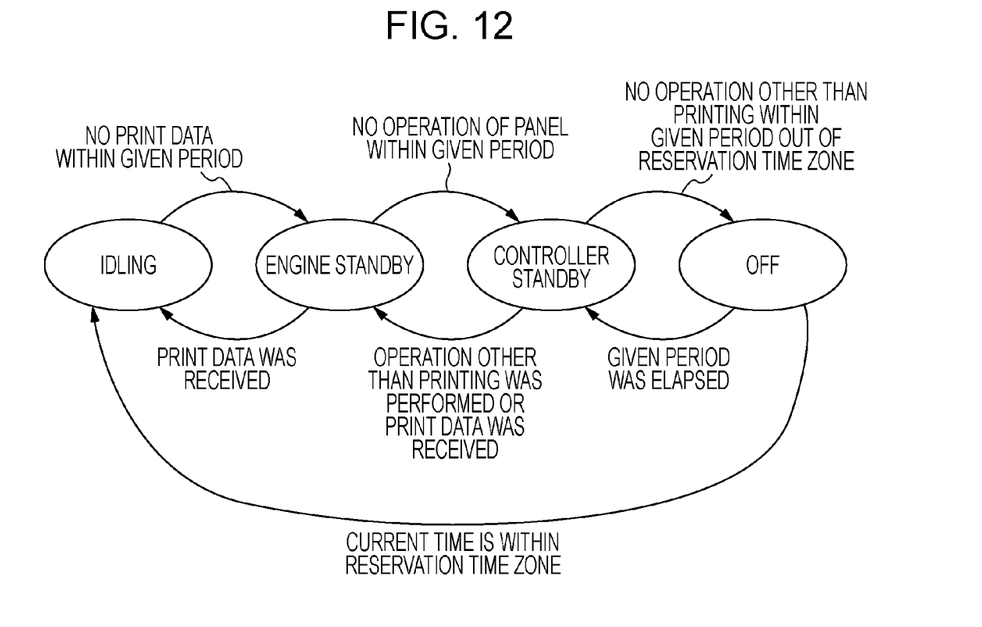
FIG. 12 is a diagram illustrating an example of state transitions among individual operation modes of a printer according to a third embodiment of the invention.

On the basis of reservation time zones having been set, the power saving control unit 140 performs control of transitions among the above-described individual operation modes in accordance with, for example, state transitions shown in FIG. 12. Descriptions thereof will be made focusing on differences from those with reference to FIG. 4.

In the off state (the power saving mode 3), the power saving control unit 140 acquires a current clock time, and monitors whether the current clock time is within any one of users' reservation time zones, or not. When this condition has been satisfied, the power saving control unit 140 performs switching of the network I/F 40 to the on state, switching of the controller 10 into the normal state, and further, switching of the printing engine 30 into the normal state, thereby causing the printer 1 to transit to the idling state (the normal mode).

In the controller standby state (the power saving mode 2), the power saving control unit 140 monitors whether or not, under the state where a current clock time is not within each of the reservation time zones, and further, any operations other than operations for printing have not been performed, a predetermined constant period of time has elapsed. When this condition has been satisfied, the power saving control unit 140 performs switching of the network I/F 40 into the off state, thereby causing the printer 1 to transit to the off state (the power saving mode 3).

When the printer 1 has returned from the off mode to the idling state (the normal mode) or the controller standby state (the power saving mode 2) in accordance with control performed by the power saving control unit 140, the query transmission unit 130 transmits a query to the network 2.

In the case where blocks of print data have been received from a plurality of PCs of the PCs 3 as responses to the query, the printing control unit 120 decides an order of printings of the received blocks of print data on the basis of reservation time zones corresponding to the respective PCs. That is, the printing control unit 120 compares pieces of identification information related to the respective PCs, which are transmission sources of the received blocks of print data, with a piece of identification information related to a PC corresponding to a reservation time zone to which a current clock time belongs. Further, the printing control unit 120 causes execution of printing based on blocks of print data, which correspond to the piece of identification information related to the PC corresponding to the reservation time zone to which the current clock time belongs, in preference to other blocks of print data.

Hereinbefore, an example of the third embodiment according to the invention has been described. According to this embodiment, it is possible to improve the convenience of the off mode of a printing apparatus just like in case of the first embodiment. Further, during each of reservation time zones, the printer 1 does not transit to the off mode, and thus, the convenience of the off mode is improved. Moreover, in the case where the printer 1 has returned from the off mode during any one of reservation time zones, printings requested by a user who has performed setting of the any one of the reservation time zones are executed in preference to printings requested by other users, and thus, the convenience of the off mode is improved.

Fourth Embodiment

Next, an example of a fourth embodiment according to the invention will be described. Hereinafter, descriptions thereof will be made focusing on differences from those of the foregoing third embodiment.

In this embodiment, the reservation time zone setting unit 150 performs setting of reservation time zones in accordance with the utilization state of the printer 1. For example, the reservation time zone setting unit 150 counts the number of printings for each hour of 24 hours of every day. That is, the reservation time zone setting unit 150 creates a histogram. Further, on the basis of this histogram, the reservation time zone setting unit 150 specifies time zones in each of which the number of printings is more than to a predetermined number, and decides the specified time zones as reservation time zones. That is, time zones in each of which the degree of frequency of printings is high are set as reservation time zones. For example, in the case where the number of printings for each hour of 9:00 to 21:00 is more than or equal to a predetermined number, these time zones are decided as the reservation time zones.

Hereinbefore, an example of the fourth embodiment according to the invention has been described. According to this embodiment, it is possible to improve the convenience of the off mode of a printing apparatus just like in case of the first embodiment. Further, during each of reservation time zones, the printer 1 does not transit to the off mode, and thus, the convenience of the off mode is improved. Moreover, in the case where the printer 1 has returned from the off mode during any one of reservation time zones, printings requested by a user who has performed setting of the any one of reservation time zone are executed in preference to printings requested by other users, and thus, the convenience of the off mode is improved. Furthermore, the reservation time zones are automatically set, and thus, the convenience of the off mode is improved.

The above-described embodiments according to the invention are intended to exemplify the gist and the scope of the invention, and do not limit the invention. Lots of alternatives, corrected examples and modified examples thereof will be apparent for those skilled in the art. Further, one or more of the features of each of the above-described embodiments may be combined.

The entire disclosure of Japanese Patent Application No. 2011-148005, filed Jul. 4, 2011 is expressly incorporated by reference herein

What is claimed is:

1. A printing apparatus which is connected to a host computer via a network, and which operates in a first mode in which network communication is enabled and in a second mode in which network communication is disabled, the printing apparatus comprising:
    a control unit configured to control a bidirectional transition between the first mode and the second mode;
    a transmission unit configured to transmit a query about print data to the host computer when a transition from the second mode to the first mode has been made;
    a reception unit configured to receive print data having been transmitted from the host computer as a response to the query;
    a printing unit configured to perform printing on the basis of the print data; and
    a setting unit configured to set a reservation time zone within which a transition from the first mode to the second mode is forbidden,
    wherein the control unit is configured to make a transition from the second mode to the first mode within the reservation time zone.

2. The printing apparatus according to claim 1, wherein the control unit is configured to make a transition of the second mode to the first mode after an elapse of a predetermined period of time from the transition of the first mode to the second mode.

3. The printing apparatus according to claim 1, wherein the control unit is configured to make a transition from the first mode to the second mode when any print data have not been received from the host computer in response to the query.

4. The printing apparatus according to claim 1,
    wherein the host computer is one of a plurality of host computers, and
    wherein the setting unit is configured to set reservation time zones each correspond to respective host computers, and the printing unit is configured to, in the case where print data from any of the host computers have been received during a reservation time zone, preferentially perform printing of print data from a host computer corresponding to the reservation time zone.

5. The printing apparatus according to claim 1, wherein the setting unit is configured to set the reservation time zone such that the frequency of printings in the reservation time zone is more than a predetermined value.

6. A printing system comprising:
    a computer; and
    a printing apparatus which operates in a first mode in which network communication is enabled and in a second mode in which network communication is disabled;
    wherein the computer includes:
        an acquisition unit configured to acquire print data;
        a reception unit configured to receive a query about print data from the printing apparatus;
        a storage unit configured to store the print data therein; and
        a transmission unit configured to, in the case where communication with the printing apparatus is available, transmit the acquired print data to the printing apparatus, and in the case where communication with the printing apparatus is not available, store the acquired print data into the storage unit, and transmit the stored print data to the printing apparatus when the query has been received;
    and wherein the printing apparatus includes:
        a control unit configured to control a bidirectional transition between the first mode and the second mode;
        a transmission unit configured to, when a transition from the second mode to the first mode has been made, transmit a query about print data to the computer;
        a reception unit configured to receive print data having been transmitted from the computer;
        a printing unit configured to perform printing on the basis of the print data; and
        a setting unit configured to set a reservation time zone within which a transition from the first mode to the second mode is forbidden,
        wherein the control unit is configured to make a transition from the second mode to the first mode within the reservation time zone.

7. A printing method using a printing system including a computer and a printing apparatus which operates in a first mode in which network communication is enabled and in a second mode in which network communication is disabled, the printing method comprising:

acquiring print data by the computer;

transmitting, by the computer, the acquired print data to the printing apparatus in the case where communication with the printing apparatus is available;

storing, by the computer, the acquired print data into the storage unit in the case where communication with the printing apparatus is not available;

transmitting, by the computer, the stored print data to the printing apparatus when a query about print data has been received from the printing apparatus;

performing control of, by the printing apparatus, a bidirectional transition between the first mode and the second mode;

transmitting, by the printing apparatus, the query about print data to the computer when a transition from the second mode to the first mode has been made;

receiving, by the printing apparatus, print data having been transmitted from the computer;

performing printing on the basis of the print data using the printing apparatus;

setting a reservation time zone within which a transition from the first mode to the second mode is forbidden; and making a transition from the second mode to the first mode within the reservation time zone.

* * * * *